June 24, 1930.   P. CHAVAROUX   1,765,904
APPARATUS ADAPTED FOR CONTINUOUS FILM TRAVEL, FOR VIEW TAKING,
PRINTING, AND PROJECTION OF CINEMATOGRAPHIC FILMS
Filed May 2, 1928   2 Sheets-Sheet 2
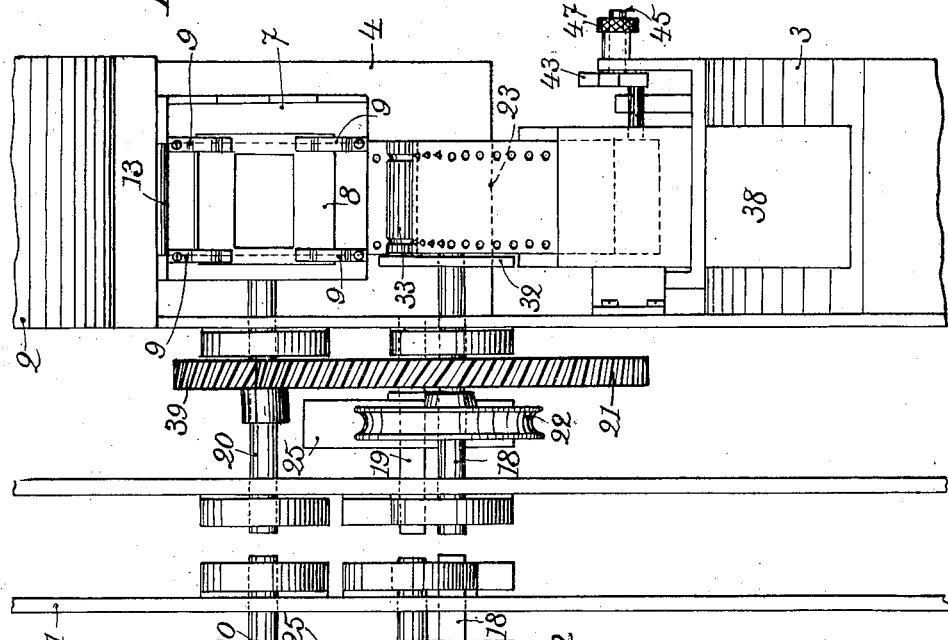
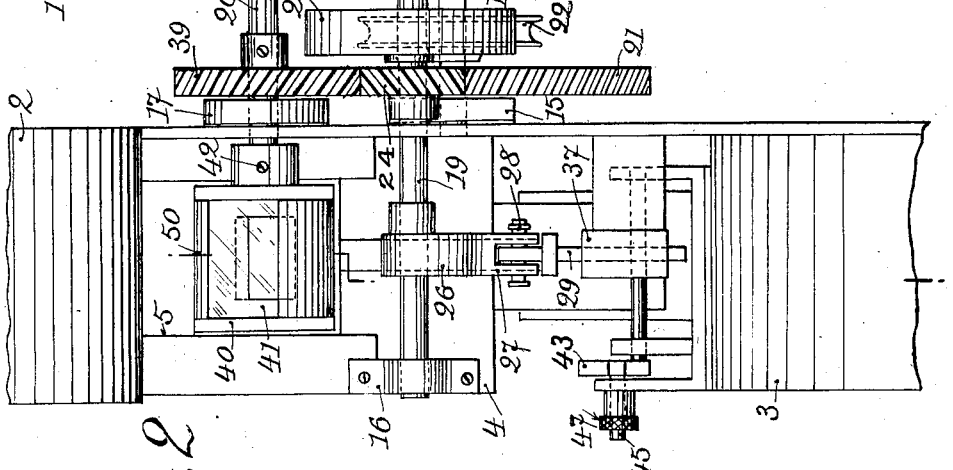
Inventor
Pierre Chavaroux,
by H. B. Willson & Co.
Attorneys Patented June 24, 1930

1,765,904

UNITED STATES PATENT OFFICE

PIERRE CHAVAROUX, OF PARIS, FRANCE

APPARATUS ADAPTED FOR CONTINUOUS FILM TRAVEL, FOR VIEW TAKING, PRINTING, AND PROJECTION OF CINEMATOGRAPHIC FILMS

Application filed May 2, 1928, Serial No. 274,557, and in France April 13, 1928.

The present invention relates to various improvements in cinematographic apparatus for view-taking or screen projection, in which the projection is improved by placing before the lens a succession of complete images framed by a movable window, and due to the synchronous motion of the film, of the glass plate and of the said window, I am enabled to obtain a fixed image on the projection screen.

According to my said invention, I employ a window having a rectilinear motion which is displaced alternately in the same direction as the film having a uniform motion, and in the contrary direction, the stroke of said window being equal to one-half the height of an image and its duration being equal to that of the stroke of the film; the position of said window is regulated in such manner that it will frame in one image of the film during the whole time in which it moves in the same direction as the latter.

The appended drawings show by way of example an embodiment of the invention.

Fig. 2 is the corresponding front view, the lens and supports being omitted and, Fig. 3 a back view.

Figure 1:
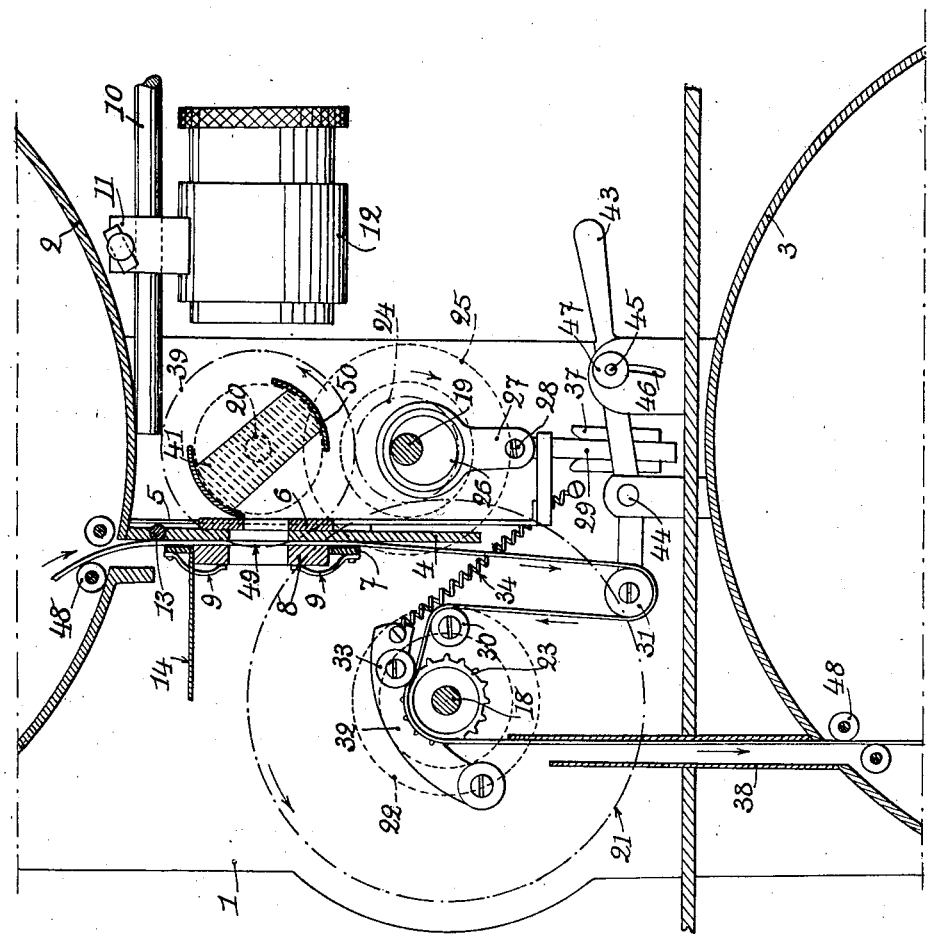
Fig. 1 is a side elevational and partly sectional view of the apparatus.

The main frame 1 on which the several parts of the apparatus are mounted comprises a feeding case and a winding case for the film; said cases are closed by hinged doors in the usual manner. Near the front of the apparatus is mounted a plate 4 carrying two guides 5 for the movable window 6, and near the rear a hinged door 7 in which is disposed the pressing frame 8 which is held by springs 9, 9.

Upon the frame 1 is mounted a rod 10 upon which is slidable the support 11 of the lens 12.

The film issues from the case 2 and travels upon the roller 13; it is protected from the light by a plate 14 whereby all danger from fire will be obviated. The frame 1 carries the ball-bearings 15—16—17 in which are mounted the respective shafts 18—19—20. Upon the shaft 18 are mounted a gear wheel, a grooved pulley 22, a toothed drum 23, and an operating handle, not shown. Upon the shaft 19 are mounted the pinion 24, the flywheel 25 and the eccentric 26. The disc of said eccentric forms a race for a ball 27 which is pivoted by an axle 29 to a rod 29 secured to the movable window 6.

The stroke of said window is equal to one-half the displacement of the film during this stroke, i. e. to one-half the height of a new image. For one revolution of the shaft 19, the window will have been given two contrary displacements, one in the direction of travel of the film, and the other in the contrary direction. A stationary roller 30 serves to feed the film at a constant height to the drum 23 irrespectively of the movements of the roller 31.

A movable support 32 carries a roller 33 whose pressure on the film is regulated by the spring 34. A guide 37 regulates the displacements of the rod 29. A trough 38 serves to guide the film from the exit end of the drum 23 to the case 3. Upon the shaft 20 are mounted a piniòn 39 and a cylindrical cage 40 comprising two flanges 50 which shut off the light while the window 6 is moving in the contrary direction to the film. In the interior of the cage 40 is disposed a flat glass plate 41.

Upon the shaft 20 is formed a groove (not shown) which permits to locate, by the screw 42, the position of the cage 40. The ratio of the gears 21, 24 and 39 is so calculated that the pinion 39 will make two revolutions while the wheel 21 makes one revolution.

The deflection produced by the rotating glass plate 41 will depend upon its index of refraction and upon its thickness; the deflection is such that during the displacement of the film by the drum 23, the horizontal light ray passing through the centre of an image on the film will remain in coincidence with the optical axis of the lens.

If the pinion 39 is rotated, the glass plate will thus deflect the rays proceeding from the window, so that they will be placed in a fixed position on the lens 12. At certain times, these rays are shut off by the flanges 50 of the cage. Due to the speed of rotation, said flanges will send a stream of air upon the film, whereby all danger of damage to the glass plate by the flame will be obviated.

The lens support 11 comprises an internal helical ramp, in such manner that when the lens is turned, the lens will be moved forward or back to obtain the focus. The roller 31 is mounted at the end of a lever 43 pivoted to an axle 44 and carrying a screw 45 engaged in a curved slot 46; a milled knob 47 holds the screw at a suitable point of the said slot. By acting on the lever 43, the operator varies the length of film comprised between the drum 23 and the window 6. In this manner the image may be optionally surrounded by the window as may be desired.

The cases 2 and 3 each contain two loose rollers 48 in such manner as to guide the film and to prevent all friction.

The case 3 carries a shaft which is actuated by means of its adjustable friction upon a grooved pulley which may be provided with a bolt connecting it with the pulley 22, or it may be driven by a motor.

The operation is as follows:

The film in the case 2 travels between the rollers 48 and the roller 13 of the door; it is pressed by the frame 8, then travels below the roller 31 and upon the roller 30, and thence upon the drum 23, at which point it is held by the roller 33; it travels thence through the channel 38 and enters the case 3 and is wound upon a reel mounted on a shaft which is driven in the usual manner.

If the shaft 18 is rotated, after exactly framing in the image, by acting upon the lever 43, the film which descends at 49 will be accompanied by the window during the descent of the latter; the glass plate deflects the rays in the horizontal direction. When the window is at its lowest point, the flanges come into action and cut off the light. While the film continues its descent and moves through the height of one-half an image, the window rises by the same amount, and resumes its original position, thus framing in a new image. The glass plate then shows its opposite side and it produces—as before—the effect of deflection whereby the horizontal ray from the centre of the image will be maintained in coincidence with the axis of the lens.

Having thus described my apparatus, what I claim as new therein, and my own invention, is:

A cinematographic apparatus adapted for the continuous travel of the film, which comprises a movable window corresponding to the dimensions of an image, means for framing the image in the said window, means for displacing said window through one-half the height of the image and for then returning the said window to the rear through a like distance, a glass plate with parallel faces which is pivotally mounted between the film and the lens, flanges mounted on the small sides of the said glass plate and adapted to cut off the beam of light during the back motion of the window, and means for rotating the said glass plate during the travel of the film whereby the beam of light will be directed upon the lens.

In testimony whereof I have hereunto affixed my signature.

PIERRE CHAVAROUX.